(12) United States Patent
Inskeep

(10) Patent No.: US 9,673,652 B2
(45) Date of Patent: Jun. 6, 2017

(54) FAST CHARGING HIGH ENERGY STORAGE CAPACITOR SYSTEM JUMP STARTER

(71) Applicant: Mathew Inskeep, Highland Beach, FL (US)

(72) Inventor: Mathew Inskeep, Highland Beach, FL (US)

( * ) Notice: Subject to any disclaimer, the term of this patent is extended or adjusted under 35 U.S.C. 154(b) by 173 days.

(21) Appl. No.: 14/509,111

(22) Filed: Oct. 8, 2014

(65) Prior Publication Data

US 2015/0102781 A1 Apr. 16, 2015

Related U.S. Application Data

(60) Provisional application No. 61/889,082, filed on Oct. 10, 2013.

(51) Int. Cl.
| | | |
|---|---|---|
| *H01M 10/44* | (2006.01) | |
| *H01M 10/46* | (2006.01) | |
| *H02J 7/00* | (2006.01) | |
| *H02J 7/34* | (2006.01) | |
| *H02J 1/00* | (2006.01) | |

(52) U.S. Cl.
CPC ............ *H02J 7/0054* (2013.01); *H02J 7/345* (2013.01); *H02J 2001/006* (2013.01)

(58) Field of Classification Search
CPC ...... H02J 7/0034; H02J 7/0042; H02J 7/0054; H02J 7/355; H02J 7/345
USPC ................. 320/103, 105, 107, 114, 166, 167
See application file for complete search history.

(56) References Cited

U.S. PATENT DOCUMENTS

| | | | | |
|---|---|---|---|---|
| 6,988,475 B2 * | 1/2006 | Burke | ................. | F02N 11/0866 320/105 |
| 2005/0162124 A1 * | 7/2005 | Bertness | ............... | H02J 7/0054 320/105 |

* cited by examiner

*Primary Examiner* — Edward Tso

(57) ABSTRACT

A fast charging high energy storage capacitor system jump starter is described. The jump starter apparatus incorporates a method of using reserve energy from a depleted electrical system such as an automobile battery, combined with a fast charging high energy capacitor bank to enable the rapid and effective way to jump start a vehicle.

19 Claims, 8 Drawing Sheets

FAST CHARGING HIGH ENERGY STORAGE CAPACITOR SYSTEM JUMP STARTER

This application claims the benefit and priority of U.S. Ser. No. 61/889,082

STATEMENT REGARDING FEDERALLY SPONSORED RESEARCH

The invention was not made under government contract nor was funded grant money used to fund the research

FIELD

The present invention relates to a portable jump starter system that allows depleted batteries typically found in automobiles to be rapidly charged to start an engine. This invention uses reserve energy from a depleted electrical system that would typically be found in a depleted car battery and rapid charges the battery through a high energy capacitor(s).

BACKGROUND

The present invention is a device that utilizes a method for using the reserve energy from a depleted electrical system and a fast charging high energy capacitor bank, comprised of at least one single cell or multiple cells for the purpose of feeding the same reserve energy back to that of a depleted electrical system at a higher voltage potential and at a rapid rate so the electrical system can be restored back to optimum performance. This can be illustrated by the following example: A car uses a car battery for the sole purpose to turn its engine over. After the engine is turned, the electrical system of the car takes over and the battery work is completed. On occasions, the car battery dies and does not have enough power to perform its work, but typically there is still reserve energy left over in the battery. This invention will take the battery's reserve energy and store it temporarily in a capacitor bank. Then, this energy will be fed back to the same car battery at a higher voltage potential and at a rapid rate so the battery in combination with the invention can turn an engine over (start the engine). The invention is not limited to the automotive industry.

This invention accomplishes the charging in two stages. The first stage is to achieve a higher energy potential than that of the energy source. This is accomplished by using an internal fast charge, up voltage converter. The second stage is to feed the extracted energy back to sustained or restart an already depleted external system that otherwise would lose functionality from a shutdown and become ineffective to restart.

The described high energy storage capacitor system is lightweight for portability and ease of use by the consumer.

SUMMARY

The present invention relates generally to a method of fast charging a high energy storage capacitor from a lower potential energy source for the purpose of providing a larger instantaneous energy boost current. Currently, storage capacitors are used in various industries as a form of storage component to quickly delivery bursts of energy especially in the transportation industry. The present invention provides a way to harvest the reserved energy from an already depleted energy source, like an automobile battery, that is incapable of restarting the a system due to low energy, and with the assistance of a high storage capacitor coupled with an energy source to provide a way to restart the system. The invention utilizes high efficiency switching regulators for high power and current control. The invention has separate auxiliary ports, one for charging the high energy storage capacitor and one for delivering the high current. Such system draws energy via three methods: (1) integrated source; (2) external source or the reserved energy of the failed system, and; (3) coupled directly or through auxiliary power cords. This system is unique in that the high energy storage capacitor once charged, can deliver instantaneous high burst of energy in seconds capable of restoring a system back to its working condition. The invention is not used as a permanent storage device or hardwired directly to an electrical system. Typically, other systems will not charge a high energy storage capacitor beyond its own energy source potential, and/or would be directly hardwired to the systems electrical system. The present invention is portable and ready to use in minutes without the need of special tools or training. It will be particularly valuable to the everyday consumer who has a depleted automotive battery and needs to jump start their vehicle without the need of another vehicle.

DRAWINGS

Figure 4:
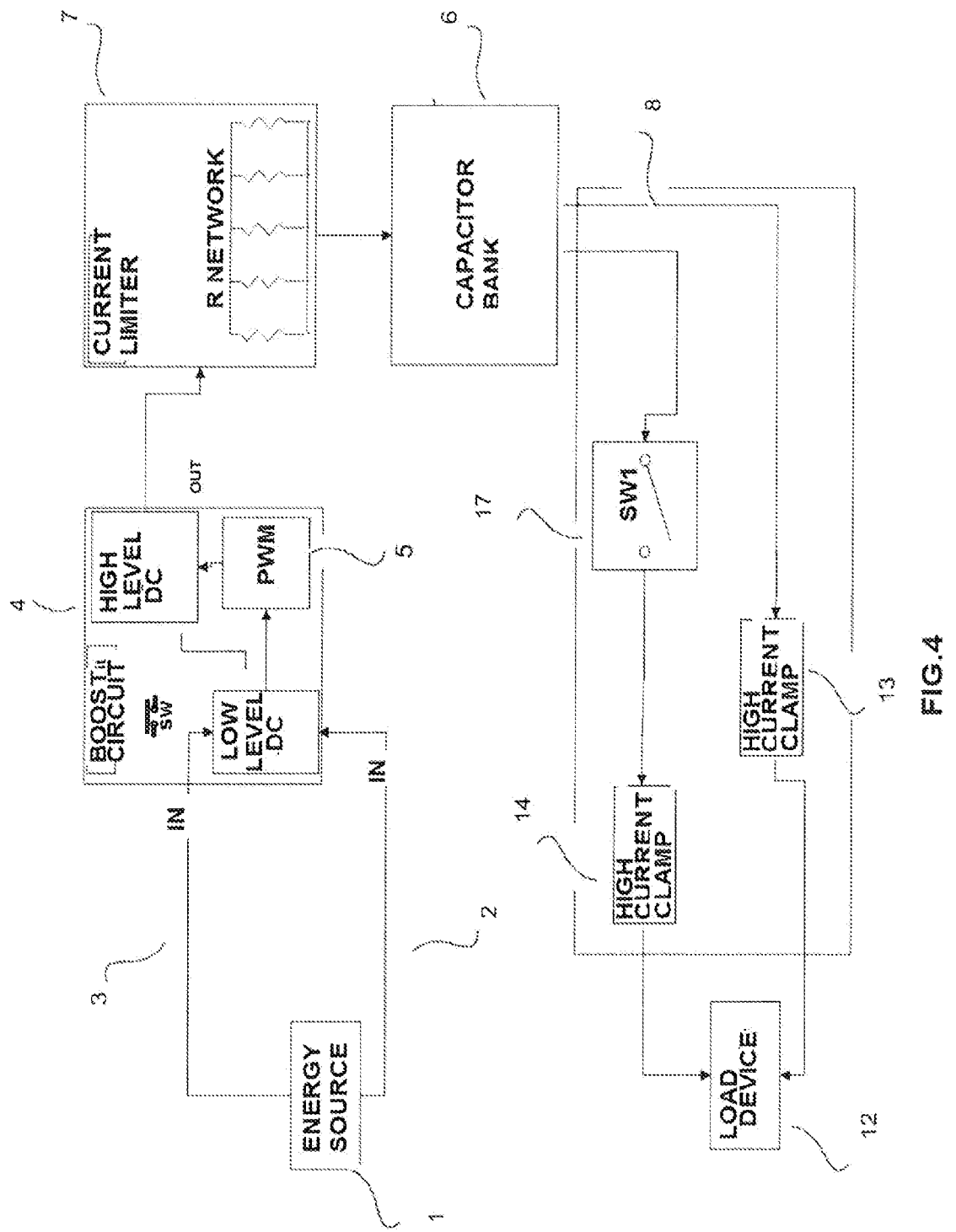

FIG. 4 represents the full system including first method to connect the basic charging system between the energy source and the high energy storage capacitor, including integrals circuit elements. In addition, FIG. 4 represents a method for connecting high energy storage capacitor output transmission line to a load device, utilizing a high power switch to activate and high current clamps to connect to load device.

Figure 5:
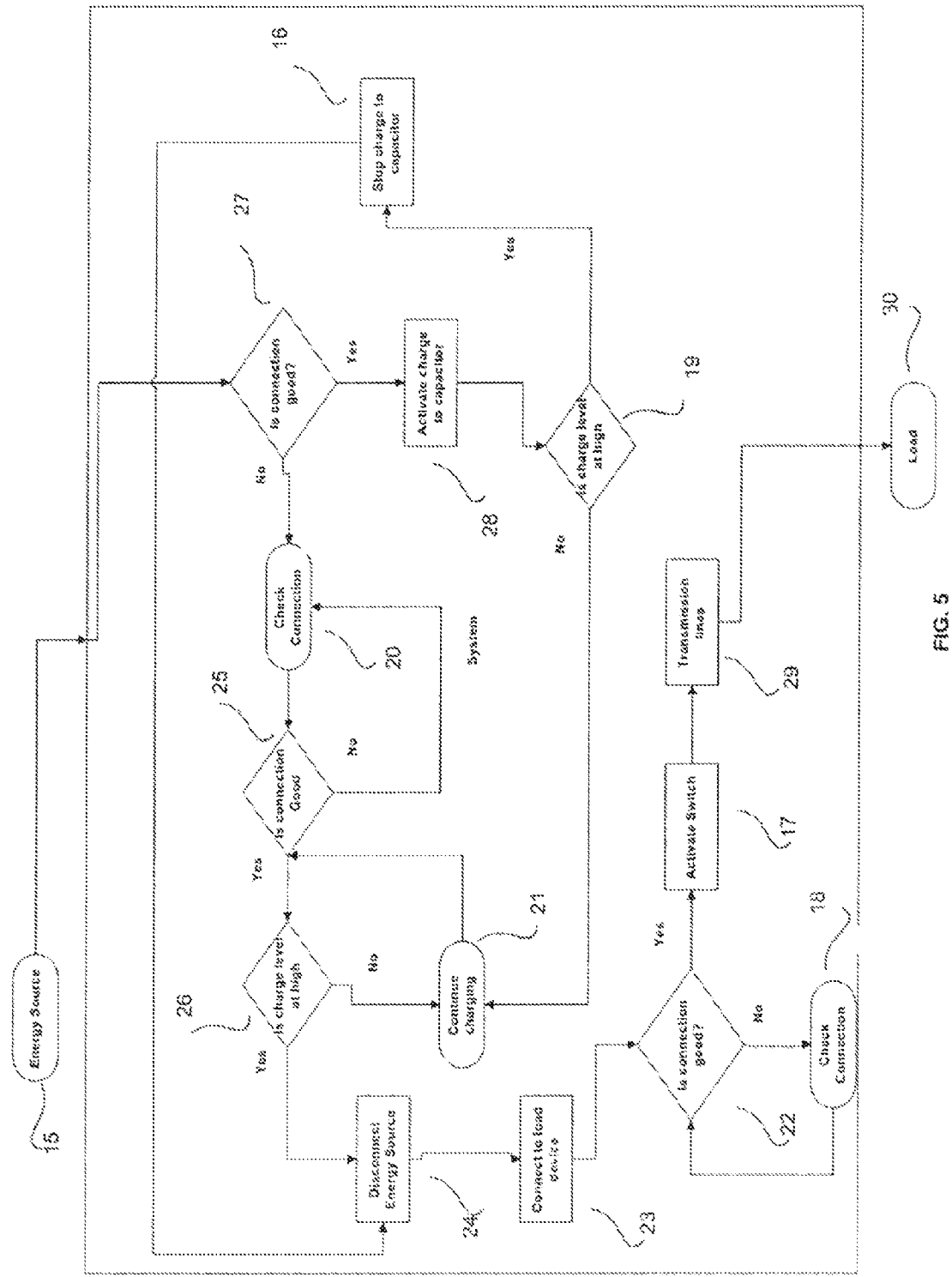

FIG. 5 is a flow diagram explaining the functionality of the integral system.

Figure 6:
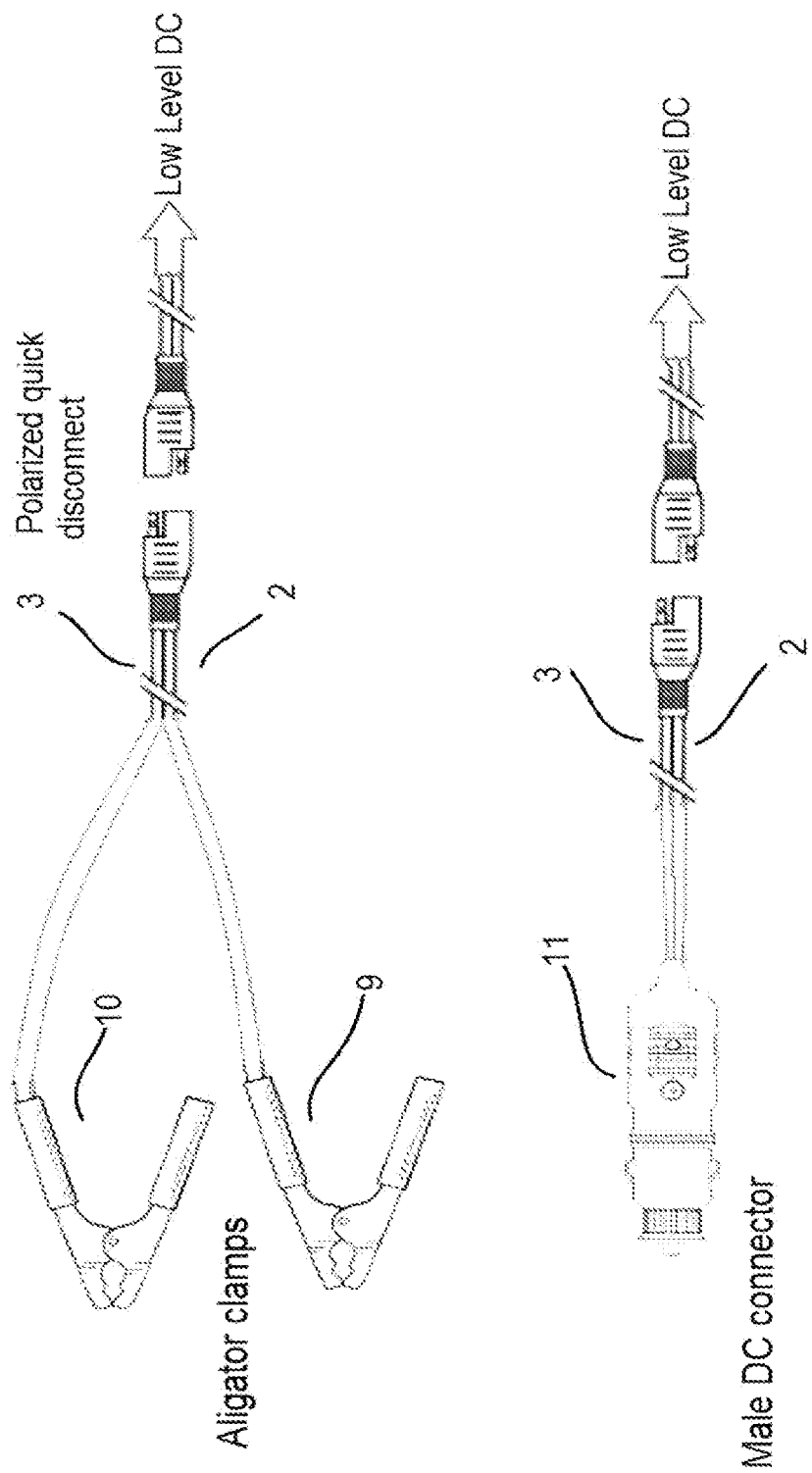

FIG. 6 is a representation of the possible accessories that could be utilize to connect the invention to an external system for energy replenishing purposes.

Figure 7:
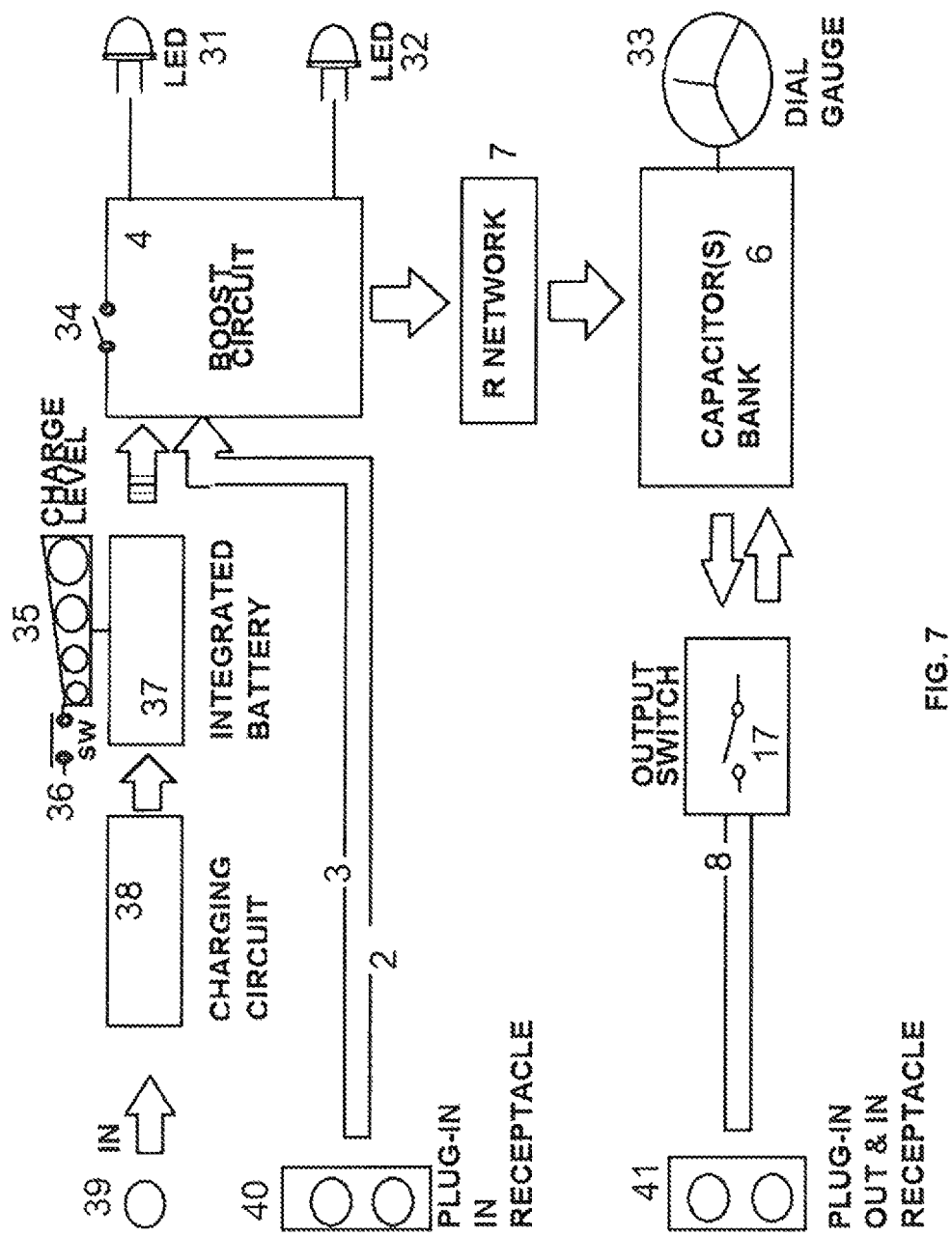

FIG. 7 is a representation of the complete system including alternative methods for external connections via input ports and output ports. Including an integral battery for fast charging the system.

Figure 8:
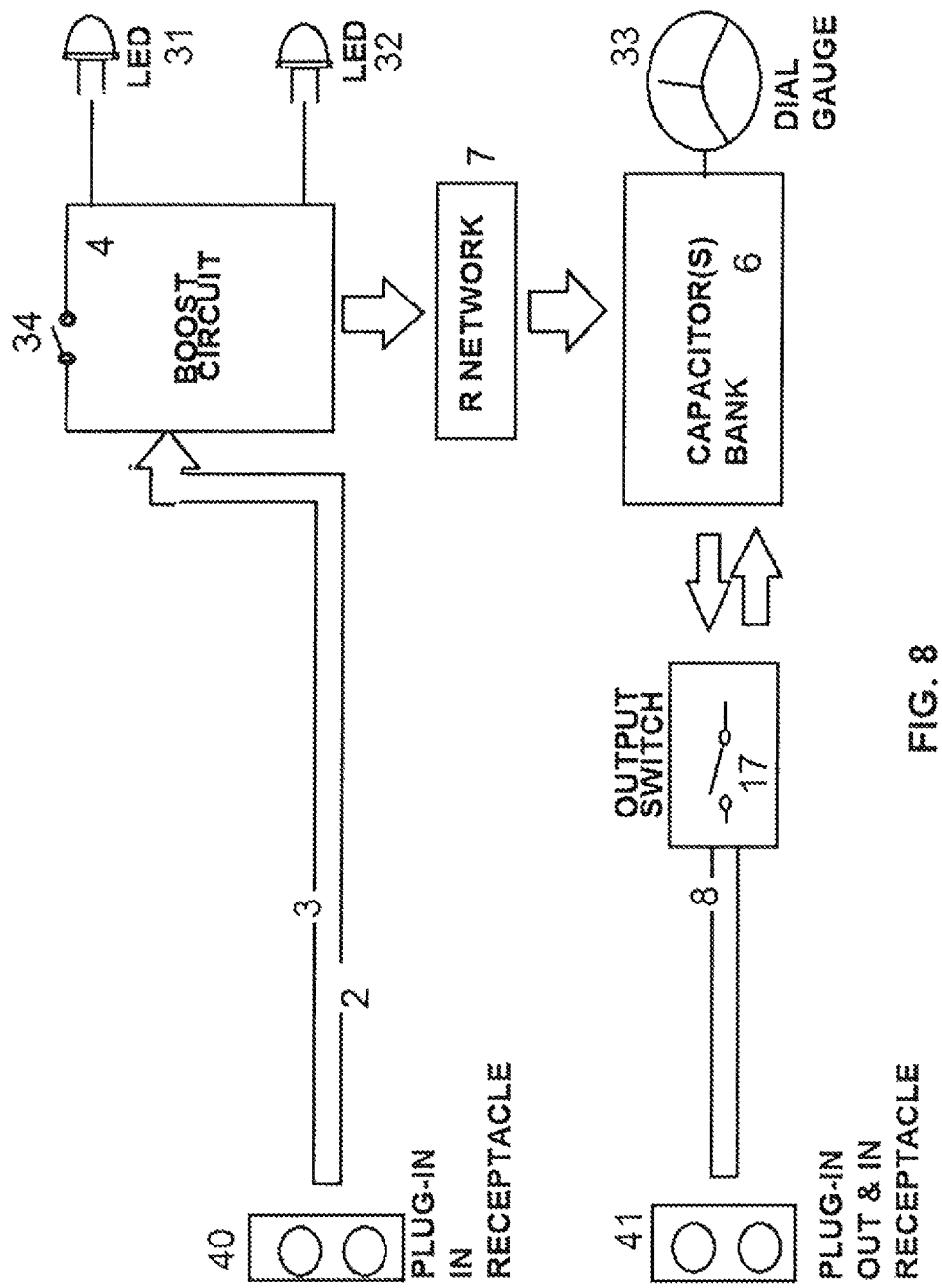

FIG. 8 is a representation of the complete system for external connections via input ports and output ports.

DETAILED DESCRIPTION

Figure 1:
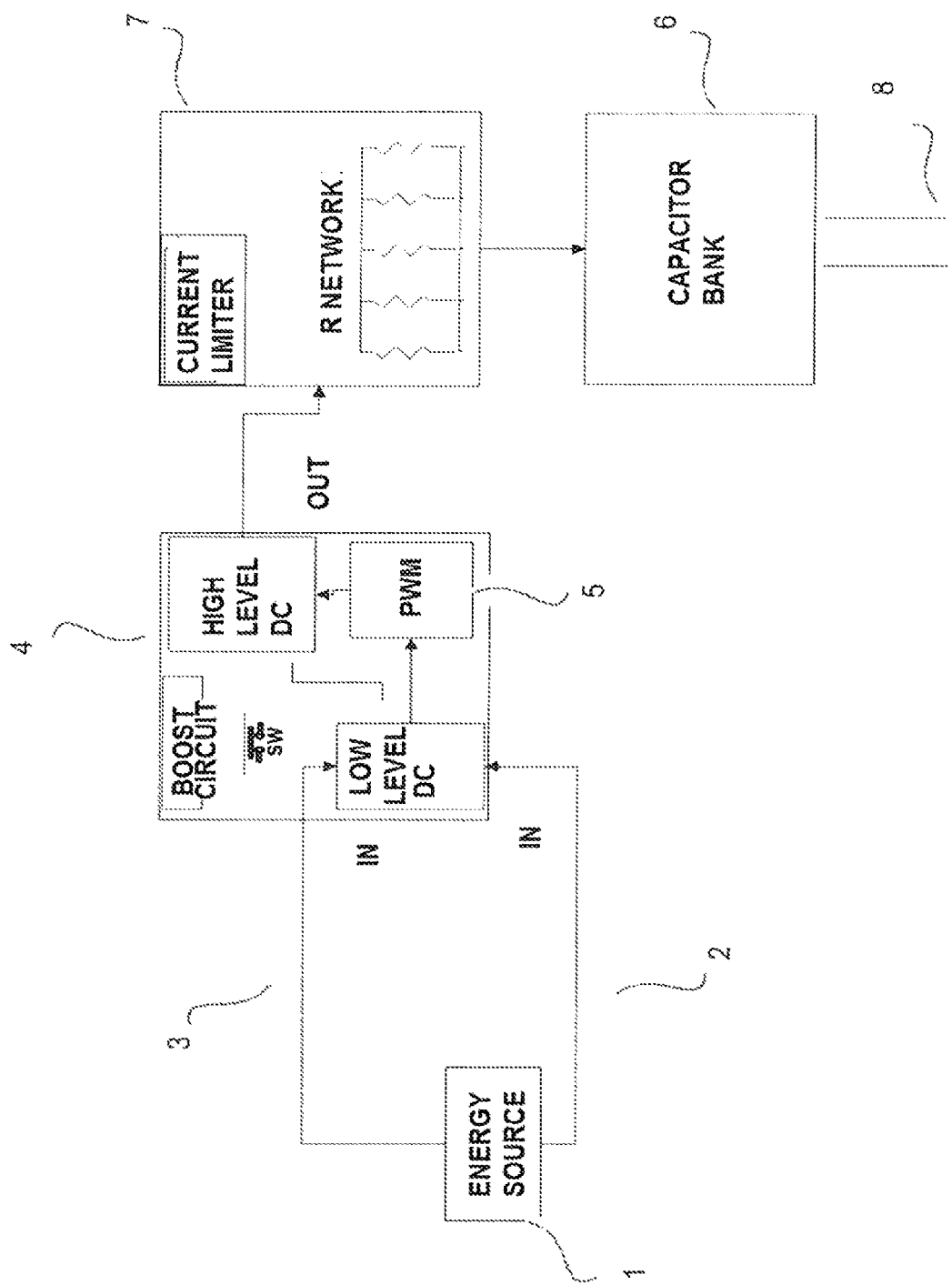
FIG. 1 is a representation of the basic charging system between the energy source and the high energy storage capacitor, including integral circuit elements and first method to connect directly to the energy source.
Figure 2:
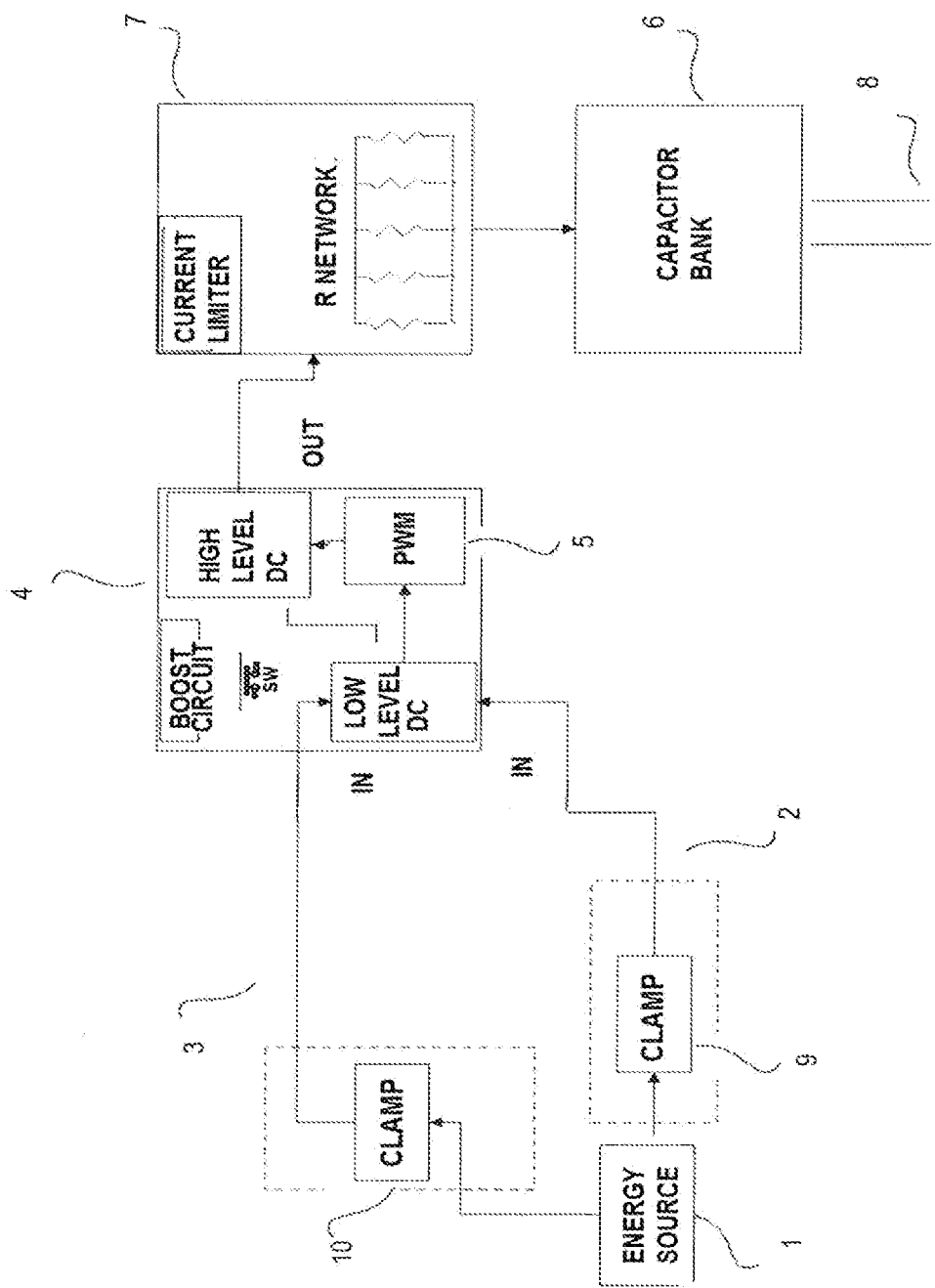
FIG. 2 is a representation of a secondary method to connect the basic charging system between the energy source and high energy storage capacitor for recharging purposes.
Figure 3:
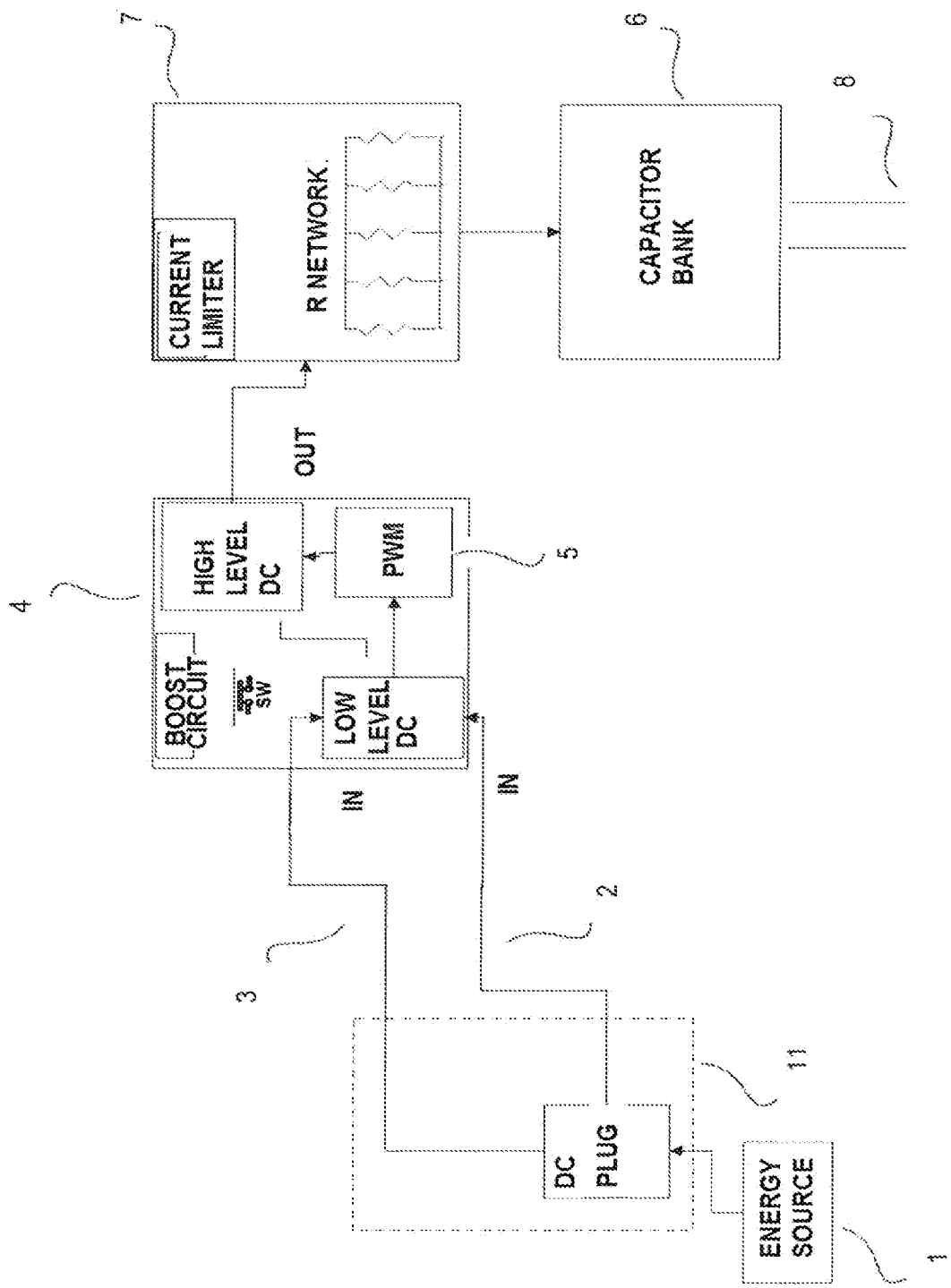
FIG. 3 represents a third method to connect the basic charging system between the energy source and high energy storage capacitor for recharging purposes.

Referring to the drawings on FIGS. 1, 2 and 3 which relate to an integral system composed of four major components coupled electrically and mechanically which represent a basic charging system between an energy source 1 and a high energy storage capacitor bank 6 comprising of at least a single cell or a capacitor bank as described and characterized by the integral system that is electrically coupled using low power transmission lines 2 and 3 as input lines, as well as, high power output/input transmission lines 8 as described. The low power transmission lines 2 and 3 will implement several methods of coupling to an integrated energy source as claimed or an external energy source. The integrated energy source 1 as described typically will be that of an integrated rechargeable battery cell or pack further described in FIG. 7. The main utility of this particular energy source 1 will be to transfer some of its energy to the capacitor bank 6. The capacitor bank 6 once fully charged will be capable to deliver a burst of higher energy potential than that of the energy source. As previously described, the capacitor bank 6 will then use this energy to restart an already depleted external system. The external energy source will typically be that of any source with at least eight volt direct current and greater than two amp hour internal capacity. This energy will be the minimum required as a system source. Additionally, internal connections between the energy source 1 and the boost circuit 4 are described on FIG. 1 which depicts an internal hardwire connection between boost circuit 4 and energy source 1 using low power transmission lines 2 and 3. Similarly, FIG. 2 shows a temporary connection between boost circuit 4 and energy source 1 using low power transmission lines 2 and 3 with an added feature of clamps 9 and 10. The clamps described in FIG. 2 are not integrated but instead they are provided as accessories to connect this system to an external source via clamping or plug in methods as shown on FIG. 6. The embodiment of the system will have a receptacle that will provide connection means between the invention and an external system further describe in FIG. 7. Yet a third method is shown in FIG. 3 with a temporary connection between boost circuit 4 and energy source 1 using low power transmission lines 2 and 3 with a single connector 11, a dc plug (see FIG. 6).

These three methods provide portability and various connection means for the user to charge the integral capacitor as claimed. FIG. 1 shows a representation of a boost circuit 4. The boost converter or step up converter as recognized in the industry, its sole purpose is to take a low level voltage potential and step it up to a higher voltage potential than that of the source. The preferred voltage signal for the invention is that of a direct current source. There are several methods for achieving a higher voltage potential functionality. This particular method for the invention will include a high frequency pulse width modulator 5 to intensify power and efficiency of our system. The boost circuit will implement a combination of integrated circuit and passive components in order to achieve the desired output of the boost circuit 4. Essentially, the boost circuit 4 will draw power from the energy source 1 through transmission lines 2 and 3, entered as low level potential signal and output as a high level potential signal feeding the current limiter circuit 7. The current limiter circuit will regulate the timing and restrict the maximum current delivery to the capacitor bank 6 as claimed. The current network will essentially regulate current flowing and charging time of the capacitor bank.

The basic internal operation and functionality of the system has been described and FIG. 4 depicts the final stage of the system. The final stage of the system is to release the stored energy inside the capacitor(s) bank 6 to an external system. The invention will utilize bidirectional high power output/input transmission lines 8. The high power transmission lines 8 can be used as an output and/or and input. The capacitor bank 6 also uses the high power transmission lines 8 to recharge itself to the same level of the external source. Moreover, the energy stored in the capacitor(s) bank 6 can only be delivered to an external load device 12 when the high output power switch 17 is activated. The high output power switch 17 can be a mechanical or a solid state device type of switch. Finally, this particular switch will interface with high current clamps 14 and 13. These clamps will connect to the external load device 12 and transfer the energy between both systems. The high current clamps 12 and 13 are permanently attached to the invention. On occasions, there will be detachable high current clamps as shown on FIG. 6. The embodiment of the system will have receptacles that provide connection means between the invention and an external system further describe in FIG. 7. It is to be noted that high power switch 17 can be installed on either high power output/input transmission lines 8. The high power auxiliary transmission line 8, as earlier described, has a two way line used for delivering power to the load and also recharging the high energy storage capacitor as supplementary to low power transmission lines 2 and 3. Unlike when charging through the lower auxiliary power transmission line, the high power auxiliary transmission line 8 can only charge to the same level as the load device 12 and will not be regulated by current limiter circuit 7.

FIG. 5 is a block diagram showing the flow operation mode of the system. Initially, the energy source 15 will be supplying the necessary energy to charge the capacitor bank as previously described. The energy source 15 will hold enough energy to transfer over to the capacitor(s) bank 6. Furthermore, the energy source could be external or integrated into the system as described on FIG. 7. The system's first process is to verify that a proper connection 27 has been successfully established between the energy source 15 and the system. This connection is detected when the boost circuit 4 detects and begins the charging process of the capacitor(s) bank 6. If no connection is detected, the integral circuit 20 will guide the user to check the connection until a solid connection exist. The good and bad connection indicator will be either by a digital display or simply light emitting diodes as shown in FIG. 7 or 8. After the connection is verified by circuit 25 (inside the boost circuit 4), the next check point 26 checks the charge level of the system. If the charge level is low, the circuit 26, 21 and 28 continues charging the system until the charge level is high and verified by circuit 19. Once this happens, the charging stops 16. At this point, the user is guided into disconnecting the energy source by circuit 24. The final stage of the process is to deliver the energy stored in the system to an external load device as previously shown on FIG. 4, Block 23, on FIG. 5, guides the user into the final stage which is to connect the system to a load device. Again, proper connection is checked and verified by circuit 22 and if connection exists, then power switch 17 can be activated and energy will flow through transmission lines 29, onto load 30. The system has a several visual indicators to guide the user to perform various tasks from the first step to connect to the energy source into final step of activating switch 17 for final energy transfer.

Lastly, similar to FIG. 4, FIG. 7 is a representation of the complete system which includes block diagrams representing other secondary components such as connecting ports and visual indicators used to assist the user during operation of this particular invention. As an option, the invention may contain an integrated system source as claimed on claim 15. The integrated battery 37 needs to be initially charged using a conventional wall cube adapter, which will connect to the in port 39, in turn the charging circuit 38 will regulate and control the voltage and current going to the integrated battery 37 and terminate the charging cycle when complete. The charge level 35 will display the amount of charge available whenever the charge level momentary switch 36 is depressed. Once this step is complete, the system can store until needed or activate the boost circuit 4 by depressing the activate boost switch 34. The working led 31 will light up indicating the boost circuit 4 is activated and working. Similarly, the visual dial gauge 33 attached to the capacitor(s) bank 6 will start raising from zero percent of charge up to one-hundred percent of charge. At this point the boost circuit 4 will stop charging, and the status led 32 will change color and indicate ready. A second version of this system, FIG. 8, will eliminate the need for the integral battery and will harvest the energy directly from an external system as described and claimed. The objective is to harvest the extracted energy to sustain or restart an already depleted external systems that otherwise would lose functionality from a shutdown and become ineffective to restart.

At this point the system is now ready to transfer its energy to an external device via output switch 17 and output/input receptacle 41. The user needs to connect to the output receptacle 41 a pair of high current clamps similar to that already described on FIG. 6 and active the output switch 17.

What is claimed is:

1. A system for aiding in starting of a motor vehicle having a vehicle battery that has been depleted to an energy level where the battery is unusable for an intended purpose but still having an amount of reserve energy, the reserve energy of the dead battery being at a specific DC voltage potential level, said system comprising:
   a boost or step up converter circuit adapted for electrical communication with the dead battery and capable of extracting the reserve energy from the dead battery and boosting a DC voltage potential for the extracted reserve energy to a higher level than the specific DC voltage potential level;
   a current limiter circuit in electrical communication with an output of the boost or step up converter circuit; and
   a single cell or capacitor bank in electrical communication with an output of the current limiter circuit, said single cell or capacitor bank adapted for electrical communication to an electrical load device and when the single cell or capacitor bank is charged the single cell or capacitor bank is capable and available for delivering energy to the load device;
   wherein the current limiter circuit restricts a maximum current delivered to the single cell or capacitor bank from the extracted reserve energy and regulates a charging time for the single cell or capacitor bank using the reserve energy extracted from the dead battery.

2. The system for aiding of claim 1 wherein the boost or step up converter including a high frequency pulse width modulator.

3. The system for aiding of claim 1 further comprising a high power switch in electrical communication with an output line of the single cell or capacitor bank, wherein the charged single cell or capacitor bank is permitted to deliver energy to the load device when the switch is closed.

4. The system for aiding of claim 1 wherein the load device is the dead battery that the reserve energy level was originally extracted from.

5. The system for aiding of claim 1 wherein the boost or step up converter circuit in electrical communication with the dead battery through a pair of transmission lines.

6. The system for aiding of claim 1 wherein the boost or step up converter circuit in electrical communication with the dead battery through a pair of transmission lines and a pair of clamps, a first of the pair of clamps connected to a first of the pair of transmission lines and a second of the pair of clamps connected to a second of the pair of transmission lines.

7. The system for aiding of claim 1 wherein the boost or step up converter circuit in electrical communication with the dead battery through a pair of transmission lines and a DC plug connected to the pair of transmission lines.

8. The system for aiding of claim 1 further comprising an integrated battery in electrical communication with the boost or step up converter circuit and a charging circuit for charging the integrated battery.

9. A method for aiding in starting of a motor vehicle having a vehicle battery that has been depleted to an energy level where the battery is unusable for an intended purpose but still having an amount of reserve energy, the reserve energy of the dead battery being at a specific DC voltage potential level, said method comprising the steps of:
   (a) extracting at least a portion of the reserve energy from a battery;
   (b) boosting or stepping up the specific DC voltage potential level of the extracted reserve energy to a higher DC voltage potential level than the specific DC voltage potential level; and
   (c) charging a single cell or capacitor bank using the extracted reserve energy boosted or stepped up to the higher DC voltage potential.

10. The method for aiding of claim 9 further comprising the step of delivering electrical energy stored in the charged single cell or capacitor bank to a load device to assist the load device in being used for an intended purpose of the load device.

11. The method for aiding of claim 9 wherein the intended purpose of the battery is for turning over an engine of a motor vehicle.

12. The method for aiding of claim 9 further comprising the step of directly or indirectly connecting a boost or step up converter circuit to the battery for performing step (a) and step (b).

13. The method for aiding of claim 9 further comprising the step of regulating the timing of using the extracted reserve energy when charging the single cell or capacitor bank in step (c).

14. The method for aiding of claim 9 further comprising the step of restricting an amount of current that is provided when charging the single cell or capacitor bank in step (c).

15. The method for aiding of claim 9 further comprising the steps of regulating the timing of using the extracted reserve energy and restricting an amount of current that is provided by a current limiter circuit when charging the single cell or capacitor bank in step (c).

16. The method for aiding of claim 10 further comprising the step of closing a high power switch in electrical communication with an output line of the single cell or capacitor bank prior to delivering electrical energy to the load device from the electrical energy stored by the single cell or capacitor bank.

17. A method for aiding in starting of a motor vehicle having a vehicle battery that has been depleted to an energy level where the battery is unusable for an intended purpose but still having an amount of reserve energy, the reserve energy of the dead battery being at a specific DC voltage potential level, said method comprising the steps of:
   (a) extracting at least a portion of the reserve energy from a battery;
   (b) boosting or stepping up the specific DC voltage potential level of the extracted reserve energy to a higher DC voltage potential level than the specific DC voltage potential level by a boost or step up converter circuit directly or indirectly electrically connected to the battery;

(c) regulating the timing of supplying the boosted or stepped up reserve energy and restricting an amount of current that is provided to a single cell or capacitor bank by a current limiter circuit in electrical communication with the single cell or capacitor bank;

(d) charging a single cell or capacitor bank using the extracted reserve energy supplied by the current limiter circuit;

(e) closing a high power switch in electrical communication with an output line of the single cell or capacitor bank in order to provide electrical communication between the single cell or capacitor bank and a load device; and (f) delivering electrical energy stored in the charged single cell or capacitor bank to a load device to assist the load device in being used for an intended purpose of the load device.

18. The method for aiding of claim 17 wherein the load device is the battery that the reserve energy was extracted from in step (a).

19. The method for aiding of claim 18 wherein the intended purpose of the battery is for turning over an engine of a motor vehicle.

* * * * *